United States Patent
Liu et al.

(10) Patent No.: US 8,982,791 B2
(45) Date of Patent: Mar. 17, 2015

(54) METHOD OF AND NODE B AND USER EQUIPMENT FOR POWER CONTROL IN CASE OF SEGMENTATION

(75) Inventors: Jinhua Liu, Beijing (CN); Johan Bergman, Stockholm (SE); Rui Fan, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 338 days.

(21) Appl. No.: 13/519,667

(22) PCT Filed: Dec. 30, 2009

(86) PCT No.: PCT/CN2009/001588
§ 371 (c)(1),
(2), (4) Date: Jul. 17, 2012

(87) PCT Pub. No.: WO2011/079420
PCT Pub. Date: Jul. 7, 2011

(65) Prior Publication Data
US 2012/0287853 A1 Nov. 15, 2012

(51) Int. Cl.
*H04W 4/00* (2009.01)
*H04W 52/12* (2009.01)
(Continued)

(52) U.S. Cl.
CPC ............ *H04W 52/12* (2013.01); *H04W 52/241* (2013.01); *H04W 52/143* (2013.01); *H04W 52/325* (2013.01); *H04W 52/36* (2013.01); *H04B 17/006* (2013.01); *H04W 52/226* (2013.01)
USPC .......................................................... 370/328

(58) Field of Classification Search
CPC ...... H04L 27/00; H04W 52/24; H04W 52/12; H04W 52/143; H04W 52/36; H04W 52/325

USPC .......................................................... 370/328
See application file for complete search history.

(56) References Cited

U.S. PATENT DOCUMENTS 8,094,682 B2 * 1/2012 Pani et al. ..................... 370/474
2002/0021714 A1 * 2/2002 Seguin .......................... 370/469
(Continued)

FOREIGN PATENT DOCUMENTS

CN 1756254 A 4/2006
CN 101160764 A 4/2008
(Continued)

OTHER PUBLICATIONS

Ericsson, "Improved EUL Power Control at UE Power Limitations", 3GPP TSG RAN WG1 Meeting #54, Jeju, Korea, Aug. 18-22, 2008, R1-083023, 6 pages.
(Continued)

*Primary Examiner* — Ricky Ngo
*Assistant Examiner* — Lan Huong Truong
(74) *Attorney, Agent, or Firm* — Rothwell, Figg, Ernst & Manbeck P.C.

(57) ABSTRACT

A method (200, 400) of and a Node B (102) and a User Equipment (UE) (106) for power control of a data channel (100, 112) between the Node B (102) and the UE (106) in a cellular communication system in case of segmentation of a Radio Link Control (RLC), Protocol Data Umt (PRC) into m Media Access Control (MAC) segments are provided The method (200, 400) comprises the steps of determining (202, 402) a transmit power boost for transmission of the MAC segments and applying (204, 404) the determined transmit power boost for transmission of the MAC segments A method (500) of and a Node B (102) for power control of an uplink data channel (112) in case of segmentation are also provided The method (500) comprises determining (504) a Signal-to-Interference Ratio (SIR) target boost and applying (506) the determined SIR target boost for power control.

20 Claims, 3 Drawing Sheets

(51) Int. Cl.
*H04W 52/24* (2009.01)
*H04W 52/14* (2009.01)
*H04W 52/32* (2009.01)
*H04W 52/36* (2009.01)
*H04B 17/00* (2006.01)
*H04W 52/22* (2009.01)

(56) References Cited

U.S. PATENT DOCUMENTS

| | | | |
|---|---|---|---|
| 2004/0141523 A1 | 7/2004 | Bhushan et al. | |
| 2004/0141525 A1 | 7/2004 | Bhushan et al. | |
| 2006/0270435 A1* | 11/2006 | Chemiakina et al. | 455/522 |
| 2007/0115871 A1* | 5/2007 | Zhang et al. | 370/318 |
| 2007/0211684 A1* | 9/2007 | Lee et al. | 370/342 |

FOREIGN PATENT DOCUMENTS

| | | |
|---|---|---|
| CN | 101331720 A | 12/2008 |
| EP | 1 128 572 A1 | 8/2001 |
| EP | 2 043 391 A1 | 4/2009 |
| WO | 2009038435 A2 | 3/2009 |
| WO | 2009088330 A1 | 7/2009 |

OTHER PUBLICATIONS

Qualcomm Europe, "Link Analysis of 2ms TTI UL VoIP Coverage", 3GPP TSG-RAN WG1 #57, San Francisco, USA, May 4-8, 2009, R1-091736, 11 pages.

Supplementary European Search Report, EP Application No. 09852705.4-1855 / 2520056, Date: Aug. 20, 2014, Applicant: Telefonaktiebolaget LM Ericsson (publ), 3 pages.

Chinese Office Action and Search Report, Application No. 2009801632237, Date: Jun. 5, 2014, Applicant: Ericsson (China) Communications Company, Ltd., with English Translation, 7 pages.

European Office Action dated Sep. 11, 2014, Application No. 09 852 705.4-1855, Applicant: Telefonaktiebolaget LM Ericsson (publ), 5 pages.

* cited by examiner

400

| UE 106 determines a transmit power boost for the MAC segments to be transmitted on the uplink data channel 112 |
| :---: |
| 402 |

↓

| UE 106 applies the determined transmit power boost for the MAC segments being transmitted on the uplink data channel 112 |
| :---: |
| 404 |

↓

| Node B 102 freezes an SIR target used for transmission of an unsegmented RLC PDU immediately prior to transmission of the $m$ MAC segments |
| :---: |
| 406 |

METHOD OF AND NODE B AND USER EQUIPMENT FOR POWER CONTROL IN CASE OF SEGMENTATION

CROSS-REFERENCE TO RELATED APPLICATION

This application is a 35 U.S.C. §371 National Phase Entry Application from PCT/CN2009/001588, filed Dec. 30, 2009, and designating the United States.

TECHNICAL FIELD

The present invention relates generally to a cellular communication system and, more particularly, to power control of a data channel between a User Equipment (UE) and a Node B in the cellular communication system in case of segmentation of a Radio Link Control (RLC) Protocol Data Unit (PDU) into a plurality of Media Access Control (MAC) segments.

BACKGROUND

In Third Generation Partnership Project (3GPP) Release 7, flexible RLC PDU size for High Speed Downlink Packet Access (HSDPA) is introduced to solve an RLC window stalling problem at a high air rate. The flexible RLC PDU size is also used to reduce protocol overhead and padding.

In 3GPP Release 8, an improved Layer 2 (L2) is introduced for High Speed Uplink Packet Access (HSUPA). MAC-i/is entity is responsible to segment a large RLC PDU into a plurality of small MAC PDUs in case of transmission failure or lack of radio resource in uplink. Further, it is proposed to use MAC segmentation functionality of the improved L2 to improve uplink coverage. In particular, an RLC PDU (e.g. a voice packet) is segmented into a plurality of small MAC PDUs according to a supportable transport format over an air interface. Then in a receiving side these small MAC PDUs are reassembled to recover the RLC PDU.

For example, the MAC segmentation functionality can be used in the following cases:
a) Case 1
   When there is a coverage problem, a data unit is segmented to fit radio conditions.
b) Case 2
   For an initial RLC transmission, a radio channel is good and a big RLC PDU is used. But in an RLC retransmission, the radio channel becomes bad and hence MAC segmentation of the retransmission may be beneficial in order to fit radio conditions.

Generally, a precondition to recover an RLC PDU is that all segments from this RLC PDU should be correctly received. Hence, Outer Loop Power Control (OLPC) per segment will result in a higher Block Error Probability (BLEP) of the recovered RLC PDU than a target Block Error Rate (BLER) of the RLC PDU. For instance, if a target BLER for a voice packet is p, a BLEP of a recovered voice packet turns to p multiplied by m when this voice packet is segmented into m segments (note that error correlation is not considered). Therefore, in order to keep the recovered voice packet meeting the target BLER p, the target BLER of each of m segments should be p divided by m.

Currently a so-called composite OLPC, which is disclosed by 3GPP Tdoc R1-091736 entitled "Link Analysis of 2 ms TTI UL VoIP coverage", has been proposed to ensure that a BLER of a recovered data unit meets a desired target BLER. The composite OLPC makes adjustments to a Signal-to-Interference Ratio (SIR) target based on whether an original data unit can be recovered or not after all segments from the original data unit are received. After several Hybrid Automatic Repeat reQuest (HARQ) transmission failures, the SIR target can be increased to a proper level and hence the recovered data unit can meet the desired target BLER.

Although the composite OLPC can make the recovered data unit meet the desired target BLER, it has a number of limitations. Firstly, the composite OLPC relates to only an uplink data channel, which fails to take into account a downlink data channel. Secondly, for a UE encountering a coverage problem, the increase of the SIR target is not favorable because the overhead of control channels is increased and the available power for data is reduced. Thirdly, since the SIR target is increased to the proper level only after several HARQ transmission failures, there is an extra packet loss/delay during the increase of the SIR target. Fourthly, if the data unit is not transmitted in segments any more, the SIR target has to be slowly decreased to a proper level, which means a radio resource waste.

SUMMARY

Therefore, it is an object of the present invention to obviate or mitigate at least some of the above limitations by providing a method of and a Node B and a UE for power control of a data channel between the Node B and the UE in a cellular communication system in case of segmentation of an RLC PDU into a plurality of MAC segments.

According to one aspect of the present invention, there is provided a method of power control of a data channel between a Node B and a UE in a cellular communication system in case of segmentation of an RLC PDU into m MAC segments. A target BLER for transmission of unsegmented RLC PDUs is set to p. The method comprises the steps of determining a transmit power boost for transmission of the MAC segments and applying the determined transmit power boost for transmission of the MAC segments. The transmit power boost is equal to a first Carrier-to-Interference Ratio (CIR) minus a second CIR. The first CIR is required for transmission of the MAC segments in order to reach a target BLER of p divided by m. The second CIR is required for transmission of the MAC segments in order to reach the target BLER p.

In an embodiment of the method, both the first CIR and the second CIR are calculated by the steps of: interpolating a Received Bit Information Rate (RBIR) in an RBIR-to-BLER table using a relevant target BLER for the MAC segments, wherein the relevant target BLER is p divided by m when calculating the first CIR and the relevant target BLER is p when calculating the second CIR; interpolating a Signal-to-Interference-plus-Noise Ratio (SINR) in an SINR-to-RBIR table using said interpolated RBIR; and converting said interpolated SINR to the first CIR or the second CIR respectively.

In an embodiment of the method, in case that the data channel is a downlink data channel from the Node B to the UE, all of the steps of said method are performed by the Node B. Preferably, said step of determining a transmit power boost comprises the step of looking up the transmit power boost in a transmit power boost table pre-generated for different number of MAC segments.

In an embodiment of the method, in case that the data channel is an uplink data channel from the UE to the Node B, said method further comprises the step of freezing an SIR target used for transmission of an unsegmented RLC PDU immediately prior to transmission of the m MAC segments when the m MAC segments are being transmitted on the uplink data channel, and all of the steps of said method are performed by the UE except that said step of freezing is performed by the Node B.

According to another aspect of the present invention, there is provided a Node B for power control of a downlink data channel from the Node B to a UE in a cellular communication system in case of segmentation of an RLC PDU into m MAC segments. A target BLER for transmission of unsegmented RLC PDUs is set to p. The Node B comprises one or more processing circuits configured to determine a transmit power boost for transmission of the MAC segments and apply the determined transmit power boost for transmission of the MAC segments. The transmit power boost is equal to a first CIR minus a second CIR. The first CIR is required for transmission of the MAC segments in order to reach a target BLER of p divided by m. The second CIR is required for transmission of the MAC segments in order to reach the target BLER p.

In an embodiment of the Node B, the one or more processing circuits are configured to calculate both the first CIR and the second CIR by: interpolating an RBIR in an RBIR-to-BLER table using a relevant target BLER for the MAC segments, wherein the relevant target BLER is p divided by m when calculating the first CIR and the relevant target BLER is p when calculating the second CIR; interpolating an SINR in an SINR-to-RBIR table using said interpolated RBIR; and converting said interpolated SINR to the first CIR or the second CIR respectively.

In an embodiment of the Node B, the one or more processing circuits are configured to determine a transmit power boost by looking up the transmit power boost in a transmit power boost table pre-generated for different number of MAC segments.

According to yet another aspect of the present invention, there is provided a UE for power control of an uplink data channel from the UE to a Node B in a cellular communication system in case of segmentation of an RLC PDU into m MAC segments. A target BLER for transmission of unsegmented RLC PDUs is set to p. The UE comprises one or more processing circuits configured to determine a transmit power boost for transmission of the MAC segments and apply the determined transmit power boost for transmission of the MAC segments. The transmit power boost is equal to a first CIR minus a second CIR. The first CIR is required for transmission of the MAC segments in order to reach a target BLER of p divided by m. The second CIR is required for transmission of the MAC segments in order to reach the target BLER p.

In an embodiment of the UE, the one or more processing circuits are configured to determine a value of the target BLER p based on ACK/NACK statistics of the unsegmented RLC PDUs.

In an embodiment of the UE, the one or more processing circuits are configured to determine a value of the target BLER p by receiving the value of the target BLER p from the Node B.

In an embodiment of the UE, the one or more processing circuits are configured to determine a transmit power boost by looking up the transmit power boost in a transmit power boost table pre-generated for different number of MAC segments.

In an embodiment of the UE, the one or more processing circuits are configured to determine a transmit power boost by receiving a transmit power boost table pre-generated for different number of MAC segments from the Node B and looking up the transmit power boost in the transmit power boost table.

According to yet another aspect of the present invention, there is provided a Node B for use with the UE as stated above. The Node B comprises one or more processing circuits configured to freeze an SIR target used for transmission of an unsegmented RLC PDU immediately prior to transmission of the m MAC segments when the m MAC segments are being transmitted on the uplink data channel.

According to yet another aspect of the present invention, there is provided a method of power control of an uplink data channel from a UE and a Node B in a cellular communication system in case of segmentation of an RLC PDU into m MAC segments. A target BLER for transmission of unsegmented RLC PDUs is set to p. The method is performed by the Node B and comprises the steps of determining an SIR target boost for transmission of the MAC segments and applying the determined SIR target boost for power control during transmission of the MAC segments. The SIR target boost is equal to a first CIR minus a second CIR. The first CIR is required for transmission of the MAC segments in order to reach a target BLER of p divided by m. The second CIR is required for transmission of the MAC segments in order to reach the target BLER p.

In an embodiment of the method, both the first CIR and the second CIR are calculated by the steps of: interpolating an RBIR in an RBIR-to-BLER table using a relevant target BLER for the MAC segments, wherein the relevant target BLER is p divided by m when calculating the first CIR and the relevant target BLER is p when calculating the second CIR; interpolating an SINR in an SINR-to-RBIR table using said interpolated RBIR; and converting said interpolated SINR to the first CIR or the second CIR respectively.

According to yet another aspect of the present invention, there is provided a Node B for power control of an uplink data channel from a UE to the Node B in a cellular communication system in case of segmentation of an RLC PDU into m MAC segments. A target BLER for transmission of unsegmented RLC PDUs is set to p. The Node B comprises one or more processing circuits configured to determine an SIR target boost for transmission of the MAC segments and apply the determined SIR target boost for power control during transmission of the MAC segments. The SIR target boost is equal to a first CIR minus a second CIR. The first CIR is required for transmission of the MAC segments in order to reach a target BLER of p divided by m. The second CIR is required for transmission of the MAC segments in order to reach the target BLER p.

In an embodiment of the Node B, the one or more processing circuits are configured to calculate both the first CIR and the second CIR by: interpolating an RBIR in an RBIR-to-BLER table using a relevant target BLER for the MAC segments, wherein the relevant target BLER is p divided by m when calculating the first CIR and the relevant target BLER is p when calculating the second CIR; interpolating an SINR in an SINR-to-RBIR table using said interpolated RBIR; and converting said interpolated SINR to the first CIR or the second CIR respectively.

BRIEF DESCRIPTION OF THE DRAWINGS

The above and other aspects, features and advantages of the present invention will be more apparent from the following more particular description thereof, presented in conjunction with the accompanying drawings, in which.

Corresponding reference characters indicate corresponding components throughout the several views of the drawings.

DETAILED DESCRIPTION

The embodiments set forth below represent the necessary information to enable those skilled in the art to practice the present invention and illustrate the best mode of the practicing the present invention. Upon reading the following description in light of the accompanying drawing figures, those skilled in the art will understand the concepts of the present invention and will recognize applications of these concepts not particularly addressed herein. It should be understood that these concepts and applications fall within the scope of the disclosure and the accompanying claims.

Throughout the description and claims of this specification, the terminology "UE" includes, but is not limited to, a user equipment, a mobile station, a mobile terminal, a mobile subscriber unit, a mobile TV client, a pager, a cellular telephone, a Personal Digital Assistant (PDA), a smart phone, a text messaging device, a network interface card, a notebook computer, or any other type of user device capable of operating in a wireless environment. The terminology "Node B" includes, but is not limited to, a base station, a Node-B, an evolved Node-B (eNode-B), or any other type of device with radio transmission/reception capabilities for providing radio coverage in a part of a cellular communication system.

The principle of the present invention is outlined first. For transmission of unsegmented RLC PDUs on a data channel between a UE and a Node B in a cellular communication system, a target BLER is set. In case of segmentation of an RLC PDU into a plurality of MAC segments, the basic concept of the present invention is to determine a transmit power boost/an SIR target boost for transmission of the MAC segments and apply the determined transmit power boost for transmission of the MAC segments/the determined SIR target boost for power control during transmission of the MAC segments. In this way, it can be ensured that a BLER of the recovered RLC PDU in a receiving side can meet the target BLER of the unsegmented RLC PDU.

Embodiments of the present invention will be described below in detail by way of example with reference to FIGS. 1-5.

Figure 1:
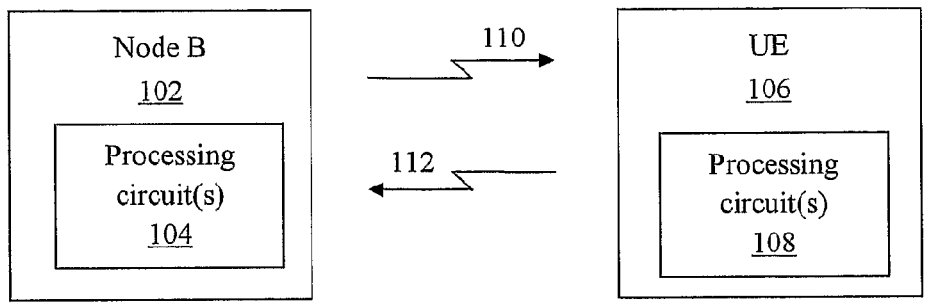
FIG. 1 is a schematic block diagram of a portion of a cellular communication system in which various embodiments of the present invention are implemented.

FIG. 1 is a schematic block diagram of a portion 100 of a cellular communication system in which various embodiments of the present invention are implemented. According to a preferred embodiment of the present invention, the cellular communication system is herein described as a Wideband Code Division Multiple Access (WCDMA) communication system. The skilled person, however, realizes that the present invention works very well on other packet based communication systems as well, such as a Long Term Evolution (LTE) communication system.

As shown in FIG. 1, the portion 100 comprises a Node B 102 including one or more processing circuits 104, and a UE 106 including one or more processing circuits 108. The Node B 102 is coupled to the UE 106 via an air interface. For sake of clarity, only one downlink data channel denoted 110 and one uplink data channel denoted 112 between the Node B 102 and the UE 106 are shown. The one or more processing circuits 104 and/or the one or more processing circuits 108 are configured to improve power control of the downlink data channel 110 and/or the uplink data channel 112 in case of segmentation of an RLC PDU into a plurality of MAC segments. It should be understood that the one or more processing circuits 104 and 108 may comprise hardware, firmware, software, or any combination thereof. Various operations performed by the one or more processing circuits 104 and 108 are given in conjunction with the following method embodiments of the present invention and are described with respect to the Node B 102 and the UE 106.

Figure 2:
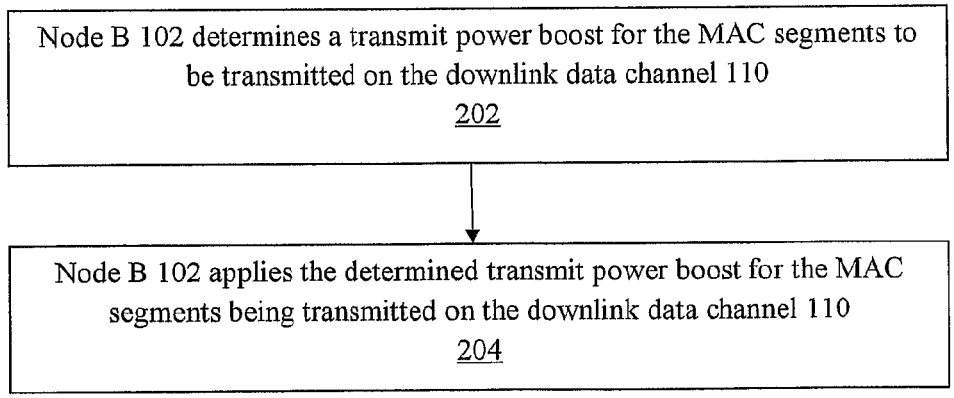
FIG. 2 schematically shows a flow chart illustrating a method of power control of a downlink data channel from a Node B to a UE in case of segmentation according to an exemplary embodiment of the present invention.

Referring to FIG. 2, there is schematically shown a flow chart illustrating a method 200 of power control of the downlink data channel 110 from the Node B 102 to the UE 106 in case of segmentation of an RLC PDU into m MAC segments, according to an exemplary embodiment of the present invention. A target BLER for transmission of unsegmented RLC PDUs is set to p. The method 200 is performed by the one or more processing circuits 104 in the Node B 102.

The method 200 begins with step 202 in which the Node B 102 determines a transmit power boost for the MAC segments to be transmitted on the downlink data channel 110. The downlink data channel 110 is a High Speed Downlink Shared Channel (HS-DSCH), for example. The transmit power boost is calculated by a required CIR for transmission of the MAC segments in order to reach a target BLER of p divided by m minus a required CIR for transmission of the MAC segments in order to reach the target BLER p, i.e. according to the following equation:

$$\Delta_{HS-DSCH} = \text{Required}Cir_{BLER=p/m} - \text{Required}Cir_{BLER=p} \quad (1)$$

Figures 3, 4:
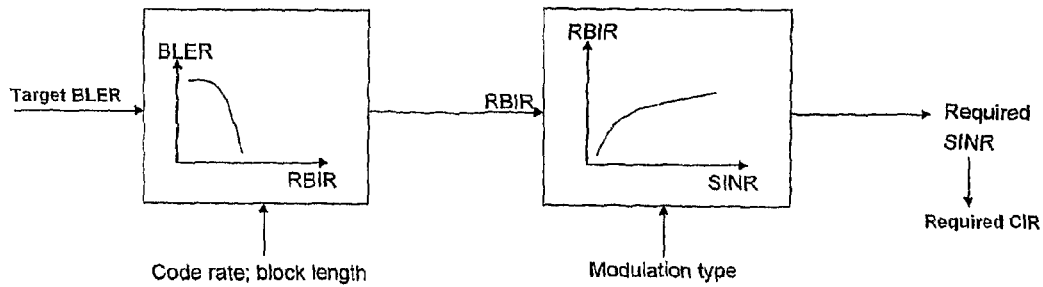
FIG. 3 schematically shows a method to get a required CIR for a certain target BlER through two interpolations.
FIG. 4 schematically shows a flow chart illustrating a method of power control of an uplink data channel from a UE to a Node B in case of segmentation according to an exemplary embodiment of the present invention.

According to embodiments of the present invention, given transport format information, the required CIR for a certain target BLER can be calculated through two interpolations as shown in FIG. 3.

There are two types of lookup tables in a previously known decoder model, which can be known from International Publication No. WO 2009/088330 A1 published on Jul. 16, 2009. One is SINR vs. normalized channel capacity (herein called RBIR), which depends on modulation type. The other is RBIR vs. BLER, which depends on channel coding type, code rate and/or code block length.

Referring to FIG. 3, the required CIR for a known target BLER can be calculated as follows:
  interpolating an RBIR in an RBIR-to-BLER table using the known target BLER, wherein the code rate and the code block length are used as index;
  interpolating an SINR in an SINR-to-RBIR table using said interpolated RBIR, wherein the modulation type is used as index; and
  converting said interpolated SINR to the required CIR per transmission according to the following equation:

$$CIR = SINR/SF \quad (2)$$

where SF is a spreading factor.

Hence, in step 202 the required CIRs for the target BLER of p divided by m and for the target BLER p are calculated for the MAC segments as above. Then, the required transmit power boost is determined by calculating the difference between the calculated required CIRs.

The Node B 102 may determine a corresponding transmit power boost for each MAC segment of the m MAC segments. Alternatively, the Node B 102 may determine a transmit power boost for a certain MAC segment of the m MAC segments, which will be used for all of the m MAC segments.

In a preferred embodiment, the Node B 102 can determine the transmit power boost by looking up the transmit power boost in a transmit power boost table pre-generated for different number of MAC segments. The transmit power boost table can be pre-generated by the Node B 102. Alternatively, the transmit power boost table can be pre-generated off line and downloaded into the Node B 102, for example, upon initial configuration of the Node B 102.

Turning to step 204 in FIG. 2, the Node B 102 applies the determined transmit power boost for the MAC segments being transmitted on the downlink data channel 110. Generally, each MAC segment of the m MAC segments is transmitted in a separate Transmission Time Interval (TTI). Since transmit power is adjusted for each TTI on the downlink data channel 110, the Node B 102 applies the determined transmit power boost from TTI to TTI.

In an embodiment of the present invention, for each TTI in which a corresponding MAC segment is to be transmitted, the Node B 102 determines a corresponding first transmit power $P_{HS\text{-}DSCH\_first}$ required for transmission of the MAC segment to reach the target BLER p on the HS-DSCH according to a transport format for the MAC segment, and uses the corresponding first transmit power plus the determined transmit power boost as a corresponding second transmit power $P_{HS\text{-}DSCH\_second}$ for transmission of the MAC segment on the HS-DSCH. This is formulated by the following equation:

$$P_{HS\text{-}DSCH\_second} = P_{HS\text{-}DSCH\_first} + \Delta_{HS\text{-}DSCH} \quad (3)$$

It is noted that the Node B 102 should leave enough power headroom for the subsequent HS-DSCH power boost when an RLC PDU is segmented.

After HS-DSCH power boost, the target BLER of each MAC segment aims at p/m and hence the recovered RLC PDU can reach the target BLER p. The method 200 can improve downlink coverage considerably and be fully controlled in network side.

In the method 200, signalling of HS-DSCH power boost to the UE 106 is not needed, resulting in a low implementation complexity. Moreover, a modification of the current communication standard is not required for the method 200.

FIG. 4 schematically shows a flow chart illustrating a method 400 of power control of the uplink data channel 112 from the UE 106 to the Node B 102 in case of segmentation of an RLC PDU into m MAC segments, according to an exemplary embodiment of the present invention. A target BLER for transmission of unsegmented RLC PDUs is set to p.

The method 400 begins with step 402 in which the UE 106 determines a transmit power boost for the MAC segments to be transmitted on the uplink data channel 112. The uplink data channel 112 is an Enhanced Dedicated Transport Channel (E-DCH), for example. Similar to the method 200, the transmit power boost is calculated by a required CIR for transmission of the MAC segments in order to reach a target BLER of p divided by m minus a required CIR for transmission of the MAC segments in order to reach the target BLER p, i.e. according to the following equation:

$$\Delta_{E\text{-}DCH} = \text{Required}Cir_{BLER=p/m} - \text{Required}Cir_{BLER=p} \quad (4)$$

According to embodiments of the present invention, given transport format information, the required CIR for a certain target BLER can be calculated for the MAC segments through two interpolations as shown in FIG. 3, which is also similar to the method 200. Hence, in step 402 the required CIRs for the target BLER of p divided by m and for the target BLER p are calculated for the MAC segments as above. Then, the required transmit power boost is determined by calculating the difference between the calculated required CIRs.

The UE 106 may determine a corresponding transmit power boost for each MAC segment of the m MAC segments. Alternatively, the UE 106 may determine a transmit power boost for a certain MAC segment of the m MAC segments, which will be used for all of the m MAC segments.

There are at least four examples for the UE 106 to determine the transmit power boost for the MAC segments. In a first example, the UE 106 determines a value of the target BLER p based on ACK/NACK statistics of the unsegmented RLC PDUs and then calculates the transmit power boost by itself. In a second example, the UE 106 determines a value of the target BLER p by receiving the value of the target BLER p from the Node B 102 and then calculates the transmit power boost by itself.

In a third example, the UE 106 looks up the transmit power boost in a transmit power boost table pre-generated for different number of MAC segments. The transmit power boost table can be pre-generated by the UE 106. Alternatively, the transmit power boost table can be pre-generated off line and downloaded into the UE 106.

In a fourth example, the UE 106 receives a transmit power boost table pre-generated for different number of MAC segments from the Node B and then looks up the transmit power boost in the transmit power boost table. The transmit power boost table can be pre-generated by the Node B 102. Alternatively, the transmit power boost table can be pre-generated off line and downloaded into the Node B 102, for example, upon initial configuration of the Node B 102.

Then in step 404, the UE 106 applies the determined transmit power boost for the MAC segments being transmitted on the uplink data channel 112. Generally, each MAC segment of the m MAC segments is transmitted in a separate TTI. Since each TTI is divided into a number of time slots where transmit power is adjusted for each time slot on the uplink data channel 112, the UE 106 applies the determined transmit power boost from time slot to time slot.

In an embodiment of the present invention, for each time slot of a TTI in which a corresponding part of an MAC segment is to be transmitted, the UE 106 determines a corresponding first transmit power $P_{E\text{-}DCH\_first}$ required for transmission of the part of the MAC segment to reach the target BLER p on the E-DCH according to a transport format for the MAC segment, and uses the corresponding first transmit power plus the determined transmit power boost as a corresponding second transmit power $P_{E\text{-}DCH\_second}$ for transmission of the part of the MAC segment on the E-DCH. This is formulated by the following equation:

$$P_{E\text{-}DCH\_second} = P_{E\text{-}DCH\_first} + \Delta_{E\text{-}DCH} \quad (5)$$

Then in step 406, the Node B 102 freezes an SIR target used for transmission of an unsegmented RLC PDU immediately prior to transmission of the m MAC segments when the m MAC segments are being transmitted on the uplink data channel 112. The Node B 102 can know whether the MAC segments are being transmitted on the uplink data channel 112 or not after receiving a first MAC segment, based on traffic type and RLC PDU size.

After E-DCH power boost, the target BLER of each MAC segment aims at p/m and hence the recovered RLC PDU can reach the target BLER p.

Through the method 400, the UE 106 autonomously boosts the transmit power for the MAC segments to a proper level.

This can avoid both the extra packet loss during the increase of the SIR target and the increase of the control channel overhead, compared to the composite OLPC as previously stated. Moreover, a modification of the current communication standard is not required for the above-mentioned first and third examples for determining the transmit power boost.

Figure 5:
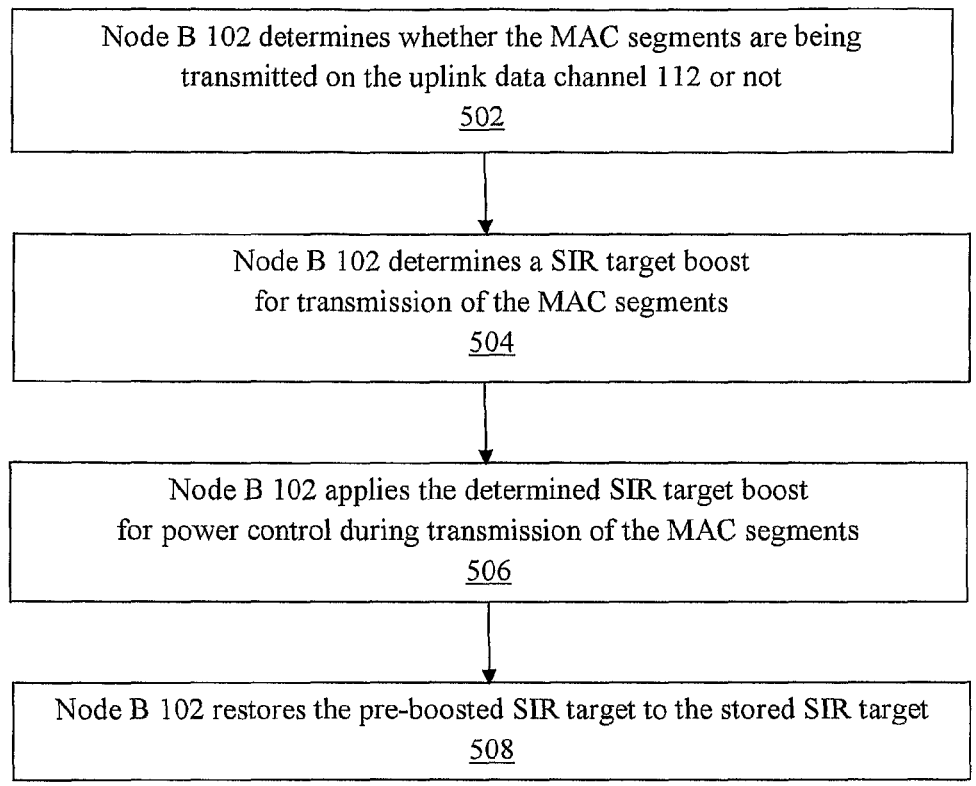
FIG. 5 schematically shows a flow chart illustrating a method of power control of an uplink data channel from a UE to a Node B in case of segmentation according to another exemplary embodiment of the present invention.

FIG. 5 schematically shows a flow chart illustrating a method 500 of power control of the uplink data channel 112 from the UE 106 to the Node B 102 in case of segmentation of an RLC PDU into m MAC segments, according to another exemplary embodiment of the present invention. A target BLER for transmission of unsegmented RLC PDUs is set to p.

The method 500 begins with step 502 in which the Node B 102 determines whether the MAC segments are being transmitted on the uplink data channel 112 or not after receiving a first MAC segment, based on traffic type and RLC PDU size.

The method 500 will proceed to step 504 if the Node B 102 determines that the MAC segments are being transmitted on the uplink data channel 112. In step 504, the Node B 102 determines a SIR target boost for transmission of the MAC segments.

The SIR target boost is calculated by a required CIR for transmission of the MAC segments in order to reach a target BLER of p divided by m minus a required CIR for transmission of the MAC segments in order to reach the target BLER p, i.e. according to the following equation:

$$\Delta_{SIR\_target} = \text{Required} Cir_{BLER=p/m} - \text{Required} Cir_{BLER=p} \quad (6)$$

According to embodiments of the present invention, given transport format information, the required CIR for a certain target BLER can be calculated for the MAC segments through two interpolations as shown in FIG. 3, which is also similar to the method 200. Hence, in step 504 the required CIRs for the target BLER of p divided by m and for the target BLER p are calculated for the MAC segments. Then the required SIR target boost is determined by calculating the difference between the calculated required CIRs.

Then in step 506, the Node B 102 applies the determined SIR target boost for power control during transmission of the MAC segments. In an embodiment of the present invention, the Node B 102 pre-boosts the SIR target by adding the SIR target boost to the current SIR target. On the other hand, the current SIR target is stored. After the SIR target pre-boost is completed, the Node B 102 freezes the pre-boosted SIR target. In this way, the determined SIR target boost is applied for power control during transmission of the MAC segments on the uplink data channel 112.

If no MAC segment is being transmitted on the uplink data channel 112, the method proceeds to step 508 in which the Node B 102 restores the pre-boosted SIR target to the above stored SIR target.

By the method 500, the Node B 102 autonomously boosts the SIR target to a proper level and holds the boosted SIR target when the MAC segments are being transmitted on the uplink data channel 112. Compared to the composite OLPC as previously stated, the extra packet loss during the increase of the SIR target can be avoided, and the SIR target can be immediately restored to a proper level when the MAC segmentation is not used.

Furthermore, only a minor modification of the current communication standard is required for the method 500, since freezing an SIR target is already accepted in 3GPP Release 8, as indicated in 3GPP Tdoc R1-083023 entitled "Improved EUL power control at UE power limitation". In particular, freezing the SIR target in the method 500 is triggered when the MAC segments are being transmitted on the uplink data channel 112, rather than when transmit power is limited in the UE 106 as indicated in the current communication standard.

Throughout the description and claims of this specification, the words "comprise", "include", and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

It will be understood that the foregoing description of the embodiments of the present invention has been presented for purposes of illustration and description. This description is not exhaustive and does not limit the claimed invention to the precise forms disclosed. Modifications and variations are possible in light of the above description or may be acquired from practicing the present invention. The claims and their equivalents define the scope of the present invention.

The invention claimed is:

1. A method of power control of a data channel between a Node B and a User Equipment, UE, in a cellular communication system in case of segmentation of a Radio Link Control, RLC, Protocol Data Unit, PDU, into m Media Access Control, MAC, segments, wherein a target Block Error Rate, BLER, for transmission of unsegmented RLC PDUs is set to p, said method comprising the steps of:
    determining a transmit power boost for transmission of the MAC segments, wherein the transmit power boost is equal to a first Carrier-to-Interference Ratio, CIR, minus a second CIR, wherein the first CIR is required for transmission of the MAC segments in order to reach a target BLER of p divided by m, and wherein the second CIR is required for transmission of the MAC segments in order to reach the target BLER p; and
    applying the determined transmit power boost for transmission of the MAC segments.

2. The method of claim 1, wherein both the first CIR and the second CIR are calculated by the steps of:
    interpolating a Received Bit Information Rate, RBIR, in an RBIR-to-BLER table using a relevant target BLER for the MAC segments, wherein the relevant target BLER is p divided by m when calculating the first CIR and the relevant target BLER is p when calculating the second CIR;
    interpolating a Signal-to-Interference-plus-Noise Ratio, SINR, in an SINR-to-RBIR table using said interpolated RBIR; and
    converting said interpolated SINR to the first CIR or the second CIR respectively.

3. The method of claim 1, wherein in case that the data channel is a downlink data channel from the Node B to the UE, all of the steps of said method are performed by the Node B.

4. The method of claim 3, wherein said step of determining a transmit power boost comprises the step of looking up the transmit power boost in a transmit power boost table pre-generated for different number of MAC segments.

5. The method of claim 1, wherein in case that the data channel is an uplink data channel from the UE to the Node B, said method further comprises the step of freezing a Signal-to-Interference Ratio, SIR, target used for transmission of an unsegmented RLC PDU immediately prior to transmission of the m MAC segments when the m MAC segments are being transmitted on the uplink data channel, and wherein all of the steps of said method are performed by the UE except that said step of freezing is performed by the Node B.

6. A Node B for power control of a downlink data channel from the Node B to a User Equipment, UE, in a cellular communication system in case of segmentation of a Radio Link Control, RLC, Protocol Data Unit, PDU, into m Media Access Control, MAC, segments, wherein a target Block Error Rate, BLER, for transmission of unsegmented RLC PDUs is set to p, said Node B comprising one or more processing circuits configured to:
   determine a transmit power boost for transmission of the MAC segments, wherein the transmit power boost is equal to a first Carrier-to-Interference Ratio, CIR, minus a second CIR, wherein the first CIR is required for transmission of the MAC segments in order to reach a target BLER of p divided by m, and wherein the second CIR is required for transmission of the MAC segments in order to reach the target BLER p; and
   apply the determined transmit power boost for transmission of the MAC segments.

7. The Node B of claim 6, wherein the one or more processing circuits are configured to calculate both the first CIR and the second CIR by:
   interpolating a Received Bit Information Rate, RBIR, in an RBIR-to-BLER table using a relevant target BLER for the MAC segments, wherein the relevant target BLER is p divided by m when calculating the first CIR and the relevant target BLER is p when calculating the second CIR;
   interpolating a Signal-to-Interference-plus-Noise Ratio, SINR, in an SINR-to-RBIR table using said interpolated RBIR; and
   converting said interpolated SINR to the first CIR or the second CIR respectively.

8. The Node B of claim 6, wherein the one or more processing circuits are configured to determine a transmit power boost by looking up the transmit power boost in a transmit power boost table pre-generated for different number of MAC segments.

9. A User Equipment, UE, for power control of an uplink data channel from the UE to a Node B in a cellular communication system in case of segmentation of a Radio Link Control, RLC, Protocol Data Unit, PDU, into m Media Access Control, MAC, segments, wherein a target Block Error Rate, BLER, for transmission of unsegmented RLC PDUs is set to p, said UE comprising one or more processing circuits configured to:
   determine a transmit power boost for transmission of the MAC segments, wherein the transmit power boost is equal to a first Carrier-to-Interference Ratio, CIR, minus a second CIR, wherein the first CIR is required for transmission of the MAC segments in order to reach a target BLER of p divided by m, and wherein the second CIR is required for transmission of the MAC segments in order to reach the target BLER p; and
   apply the determined transmit power boost for transmission of the MAC segments.

10. The UE of claim 9, wherein the one or more processing circuits are configured to determine a value of the target BLER p based on ACK/NACK statistics of the unsegmented RLC PDUs.

11. The UE of claim 9, wherein the one or more processing circuits are configured to determine a value of the target BLER p by receiving the value of the target BLER p from the Node B.

12. The UE of claim 9, wherein the one or more processing circuits are configured to determine a transmit power boost by looking up the transmit power boost in a transmit power boost table pre-generated for different number of MAC segments.

13. The UE of claim 9, wherein the one or more processing circuits are configured to determine a transmit power boost by:
   receiving a transmit power boost table pre-generated for different number of MAC segments from the Node B; and
   looking up the transmit power boost in the transmit power boost table.

14. A Node B for use with the UE of claim 9, the Node B comprising one or more processing circuits configured to freeze a Signal-to-Interference Ratio, SIR, target used for transmission of an unsegmented RLC PDU immediately prior to transmission of the m MAC segments when the m MAC segments are being transmitted on the uplink data channel.

15. The UE of claim 9, wherein the one or more processing circuits are configured to calculate the first CIR and the second CIR by:
   interpolating a Received Bit Information Rate, RBIR, in an RBIR-to-BLER table using a relevant target BLER for the MAC segments, wherein the relevant target BLER is p divided by m when calculating the first CIR and the relevant target BLER is p when calculating the second CIR;
   interpolating a Signal-to-Interference-plus-Noise Ratio, SINR, in an SINR-to-RBIR table using said interpolated RBIR; and
   converting said interpolated SINR to the first CIR or the second CIR respectively.

16. The UE of claim 9, wherein in case that the data channel is an uplink data channel from the UE to the Node B, the one or more processing circuits are configured to freeze a Signal-to-Interference Ratio, SIR, target used for transmission of an unsegmented RLC PDU immediately prior to transmission of the m MAC segments when the m MAC segments are being transmitted on the uplink data channel, and wherein all of the one or processing steps are performed by the UE, except said step of freezing is performed by the Node B.

17. A method of power control of an uplink data channel from a User Equipment, UE, and a Node B in a cellular communication system in case of segmentation of a Radio Link Control, RLC, Protocol Data Unit, PDU, into m Media Access Control, MAC, segments, wherein a target Block Error Rate, BLER, for transmission of unsegmented RLC PDUs is set to p, said method performed by the Node B comprising the steps of:
   determining a Signal-to-Interference Ratio, SIR, target boost for transmission of the MAC segments, wherein the SIR target boost is equal to a first Carrier-to-Interference Ratio, CIR, minus a second CIR, wherein the first CIR is required for transmission of the MAC segments in order to reach a target BLER of p divided by m, and wherein the second CIR is required for transmission of the MAC segments in order to reach the target BLER p; and
   applying the determined SIR target boost for power control during transmission of the MAC segments.

18. The method of claim 17, wherein both the first CIR and the second CIR are calculated by the steps of:
   interpolating a Received Bit Information Rate, RBIR, in an RBIR-to-BLER table using a relevant target BLER for the MAC segments, wherein the relevant target BLER is p divided by m when calculating the first CIR and the relevant target BLER is p when calculating the second CIR;

interpolating a Signal-to-Interference-plus-Noise Ratio, SINR, in an SINR-to-RBIR table using said interpolated RBIR; and converting said interpolated SINR to the first CIR or the second CIR respectively.

19. A Node B for power control of an uplink data channel from a User Equipment, UE, to the Node B in a cellular communication system in case of segmentation of a Radio Link Control, RLC, Protocol Data Unit, PDU, into m Media Access Control, MAC, segments, wherein a target Block Error Rate, BLER, for transmission of unsegmented RLC PDUs is set to p, said Node B comprising one or more processing circuits configured to:

determine a Signal-to-Interference Ratio, SIR, target boost for transmission of the MAC segments, wherein the SIR target boost is equal to a first Carrier-to-Interference Ratio, CIR, minus a second CIR, wherein the first CIR is required for transmission of the MAC segments in order to reach a target BLER of p divided by m, and wherein the second CIR is required for transmission of the MAC segments in order to reach the target BLER p; and apply the determined SIR target boost for power control during transmission of the MAC segments.

20. The Node B of claim 19, wherein the one or more processing circuits are configured to calculate both the first CIR and the second CIR by:

interpolating a Received Bit Information Rate, RBIR, in an RBIR-to-BLER table using a relevant target BLER for the MAC segments, wherein the relevant target BLER is p divided by m when calculating the first CIR and the relevant target BLER is p when calculating the second CIR;

interpolating a Signal-to-Interference-plus-Noise Ratio, SINR, in an SINR-to-RBIR table using said interpolated RBIR; and converting said interpolated SINR to the first CIR or the second CIR respectively.

* * * * *